United States Patent
Song et al.

(10) Patent No.: US 12,530,514 B2
(45) Date of Patent: Jan. 20, 2026

(54) METHOD OF DESIGNING TERNARY LOGIC CIRCUIT USING MOSFETS HAVING DEPLETION-MODE AND MULTI-VTHS, AND DEVICE AND RECORDING MEDIUM FOR PERFORMING THE SAME

(71) Applicant: KYUNGPOOK NATIONAL UNIVERSITY INDUSTRY-ACADEMIC COOPERATION FOUNDATION, Daegu (KR)

(72) Inventors: Taigon Song, Daegu (KR); Hyundong Lee, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 590 days.

(21) Appl. No.: 18/096,344

(22) Filed: Jan. 12, 2023

(65) Prior Publication Data

US 2024/0028806 A1    Jan. 25, 2024

(30) Foreign Application Priority Data

Jul. 21, 2022  (KR) .................... 10-2022-0090310
Dec. 12, 2022  (KR) .................... 10-2022-0172830

(51) Int. Cl.
*G06F 30/36* (2020.01)
*G06F 30/20* (2020.01)
(Continued)

(52) U.S. Cl.
CPC ............ *G06F 30/36* (2020.01); *G06F 30/327* (2020.01); *H03K 19/0944* (2013.01); *G06F 30/20* (2020.01); *G06F 30/392* (2020.01)

(58) Field of Classification Search
CPC ...... G06F 30/36; G06F 30/327; G06F 30/392; G06F 30/20; H03K 19/0944
(Continued)

(56) References Cited

U.S. PATENT DOCUMENTS 5,986,476 A  *  11/1999  De .................... H03K 19/0019
                                                            326/97
6,031,403 A  *  2/2000  Gersbach ......... H03K 3/356008
                                                            327/210
(Continued)

FOREIGN PATENT DOCUMENTS

CN        111046617 A         4/2020
CN        114337651 A    *    4/2022
(Continued)

OTHER PUBLICATIONS

Nair et al., "Delay Insensitive Ternary CMOS Logic for Secure Hardware", Journal of Low Power Electronics and Applicaitons, No. 5 , Sep. 11, 2015, pp. 183-215. (Year: 2015).*
(Continued)

*Primary Examiner* — Phallaka Kik
(74) *Attorney, Agent, or Firm* — Bridgeway IP Law Group, PLLC; Sang Ho Lee; Hyun Woo Shin

(57) ABSTRACT

Provided is a method of designing a ternary logic circuit using MOSFETs having a depletion-mode and multiple threshold voltages, and the method includes configuring a pull-half network (PHN) by connecting two or more DEP-FETs, configuring one or more of a PUN and a PDN with one or more MOSFETs having different threshold voltages, and connecting the PHN to one or more of the PUN and the PDN. Accordingly, it is possible to design a ternary logic circuit that enables low-power operation because there is no
(Continued)

static current consumption, which is a chronic problem of the ternary circuits, in all logic states including an intermediate state '0.'

8 Claims, 19 Drawing Sheets

(51) Int. Cl.
*G06F 30/327* (2020.01)
*G06F 30/392* (2020.01)
*H03K 19/0944* (2006.01)

(58) Field of Classification Search
USPC .................................. 716/104, 122; 703/15
See application file for complete search history.

(56) References Cited

U.S. PATENT DOCUMENTS

| | | | | |
|---|---|---|---|---|
| 6,163,171 | A * | 12/2000 | Jinbo | H03K 19/00315 326/119 |
| 6,681,355 | B1 * | 1/2004 | Gion | G01R 31/318575 714/740 |
| 7,449,913 | B1 * | 11/2008 | Hung | H03K 17/6872 327/170 |
| 7,948,791 | B1 * | 5/2011 | de Jong | G11C 11/4125 365/154 |
| 9,496,872 | B1 * | 11/2016 | Kuenemund | H03K 19/094 |
| 9,548,737 | B1 * | 1/2017 | Kuenemund | H03K 19/00315 |
| 10,529,412 | B1 * | 1/2020 | Arai | H03K 3/0372 |
| 11,271,569 | B2 * | 3/2022 | Park | H03K 19/0944 |
| 11,687,147 | B1 * | 6/2023 | Kamal | G11C 29/50 713/324 |
| 2002/0021146 | A1 * | 2/2002 | Deng | H03K 19/0948 326/103 |
| 2002/0024358 | A1 * | 2/2002 | Deng | H03K 19/01721 326/44 |
| 2007/0080725 | A1 * | 4/2007 | Byeon | G11C 7/20 327/143 |
| 2018/0166433 | A1 * | 6/2018 | Fujiwara | G06F 30/398 |
| 2020/0210637 | A1 * | 7/2020 | Kang | G06F 30/373 |

FOREIGN PATENT DOCUMENTS

| | | | | |
|---|---|---|---|---|
| JP | 2007527591 | A * | 9/2007 | G11C 15/04 |
| KR | 10-2007-0003818 | A | 1/2007 | |
| KR | 10-0924367 | B1 | 10/2009 | |
| KR | 10-1659159 | B1 | 9/2016 | |
| KR | 10-1689159 | B1 | 12/2016 | |
| KR | 10-2018-0013789 | A | 2/2018 | |
| KR | 101967872 | B1 * | 8/2019 | G06F 7/523 |
| KR | 10-2130980 | B1 | 7/2020 | |
| KR | 10-2348169 | B1 | 1/2022 | |

OTHER PUBLICATIONS

Unutulmaz et al., "Implementaiton and Applications of a Ternary Threshold Logic Gate", Springer Nature, 2021, 19 pages. (Year: 2021).*

Mirzaee et al., "High-Efficient Circuits for Ternary Addition", Hindawi Publishing Corporation VLSI Design, Sep. 2014, 15 pages. (Year: 2014).*

Seger, "Exploring ternary logic: including ternary inverters using complementary MOSFETs", https://medium.com/@rxseger/exploring-ternary-logic-building-a-simple-ternary-inverter-using-complementary-mosfets-c997f2f87c4d, Nov. 19, 2016, 48 pages. (Year: 2016).*

* cited by examiner

|  | DEP-FET |
|---|---|
| PMOS | $P_{dep}$ |
| Symbol | G⊸╡⊢B (S top, D bottom) |
| Threshold voltage ($V_{th}$) | $\frac{1}{3}V_{DD}$ |
| NMOS | $N_{dep}$ |
| Symbol | G⊢╡⊸B (D top, S bottom) |
| Threshold voltage ($V_{th}$) | $-\frac{1}{3}V_{DD}$ |

FIG. 2A

| | Multi-V$_{th}$ MOSFET | |
|---|---|---|
| PMOS | P$_{hvt}$ | P$_{lvt}$ |
| Symbol |  |  |
| Threshold voltage (V$_{th}$) | $-\frac{2}{3}V_{DD}$ | $-\frac{1}{3}V_{DD}$ |
| NMOS | N$_{hvt}$ | N$_{lvt}$ |
| Symbol |  |  |
| Threshold voltage (V$_{th}$) | $\frac{2}{3}V_{DD}$ | $\frac{1}{3}V_{DD}$ |

METHOD OF DESIGNING TERNARY LOGIC CIRCUIT USING MOSFETS HAVING DEPLETION-MODE AND MULTI-VTHS, AND DEVICE AND RECORDING MEDIUM FOR PERFORMING THE SAME

CROSS-REFERENCE TO RELATED APPLICATION(S)

This application claims priority under 35 USC § 119 to Korean patent application Nos. 10-2022-0090310 filed on Jul. 21, 2022, and 10-2022-0172830 filed on Dec. 12, 2022, the entire contents of which are hereby incorporated by reference.

BACKGROUND

1. Field of the Invention

The present disclosure relates to a method of designing a ternary logic circuit, which enables a low-power operation using depletion-mode MOSFETs, and a device and a recording medium for performing the same, and more particularly, to a ternary logic circuit design capable of a low-power operation due to no static current consumption in all logic states including '0.'

2. Discussion of Related Art

The development of binary computers has been made based on the improvement of integration technology through miniaturization of devices. A FinFET and a Nanosheet FET are good examples of this trend. However, as the device miniaturization technology reaches several nm-scale, the difficulty of the technology is rapidly increasing, and various studies predict that this development will soon reach its limit. Therefore, the industry is looking for new ways to improve computational performance.

A ternary computing system requires about 36.9% fewer computing numbers and storage space than a binary computing system. The characteristics of the ternary computing system enable high-density, high-performance implementation of a computing circuit. Due to these advantages of the ternary computing system, ternary semiconductors are currently receiving a lot of attention as a key element for the development of computer performance.

In addition, with the development of device technology, various elements such as a ternary CMOS, a CNTFET, and a memristor that can design a ternary computer have appeared. The advent of this technology provides a clear opportunity to develop a ternary computer.

The most important key in implementing a ternary circuit is the expression of an intermediate state '0.' To this end, the conventional ternary circuit design expresses the intermediate state '0' using 1) voltage distribution using passive elements such as resistors or memristors, and 2) voltage drop using active elements such as diodes and MOSFETs. However, these methods have a problem in that very large static power consumption occurs while outputting '0' due to a short-circuit current between GND and $V_{DD}$.

SUMMARY OF THE INVENTION

The present disclosure is directed to providing a method of designing a ternary logic circuit, which enables a low-power operation by using depletion-mode MOSFETs capable of a low-power operation due to no static current consumption in all logic states including '0.'

The present disclosure is also directed to providing a storage medium in which a computer program for performing a ternary logic circuit design method, which enables a low-power operation using depletion mode MOSFETs is recorded.

The present disclosure is also directed to providing a device configured to design a ternary logic circuit, which enables a low-power operation using depletion mode MOSFETs.

According to an exemplary embodiment of the present invention, a method of designing a ternary logic circuit using MOSFETs having a depletion mode and multiple threshold voltages includes: configuring a pull-half network (PHN) by connecting two or more DEP-FETs; configuring one or more of a PUN and a PDN with one or more MOSFETs having different threshold voltages; and connecting the PHN to one or more of the PUN and the PDN.

In the exemplary embodiment of the present disclosure, a Pdep and an Ndep may be connected in series in the two or more DEP-FETs.

In the exemplary embodiment of the present disclosure, the PUN may be one or more of a Phvt and a Plvt, and the PDN may be one or more of an Nhvt and an Nlvt.

In the exemplary embodiment of the present disclosure, the method may include configuring one or more logic circuits among an ICI, a DCI, a T-CDEC, a 3:1 T-MUX, NCONS, and ANY by further including one or more transistors.

In the exemplary embodiment of the present disclosure, the method may include configuring a CONS logic circuit by adding an STI to the NCONS logic circuit, or configuring a NANY logic circuit by adding an STI to the ANY logic circuit.

In the exemplary embodiment of the present disclosure, the method may include configuring a T-SUM logic circuit by connecting the ICI, DCI, and 3:1 T-MUX logic circuits.

According to another exemplary embodiment of the present invention, in a computer-readable storage medium in which a computer program is recorded, a computer program configured to perform the method of designing a ternary logic circuit using MOSFETs having a depletion-mode and multiple threshold voltages may be recorded.

According to still another exemplary embodiment of the present invention, a device for designing a ternary logic circuit using MOSFETs having a depletion-mode and multiple threshold voltages includes: a processor; and a memory connected to the processor, and the memory may store program instructions executed by the processor to configure a pull-half network (PHN) by connecting two or more DEP-FETs in series, configure one or more of a PUN and a PDN with one or more MOSFETs having different threshold voltages, and connect the PHN to one or more of the PUN and the PDN.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIGS. 2A-2B illustrate symbols and threshold voltages of DEP-FETs and multi-$V_{th}$ MOSFETs according to the present disclosure;

DETAILED DESCRIPTION OF EXEMPLARY EMBODIMENTS

Figure 1A:
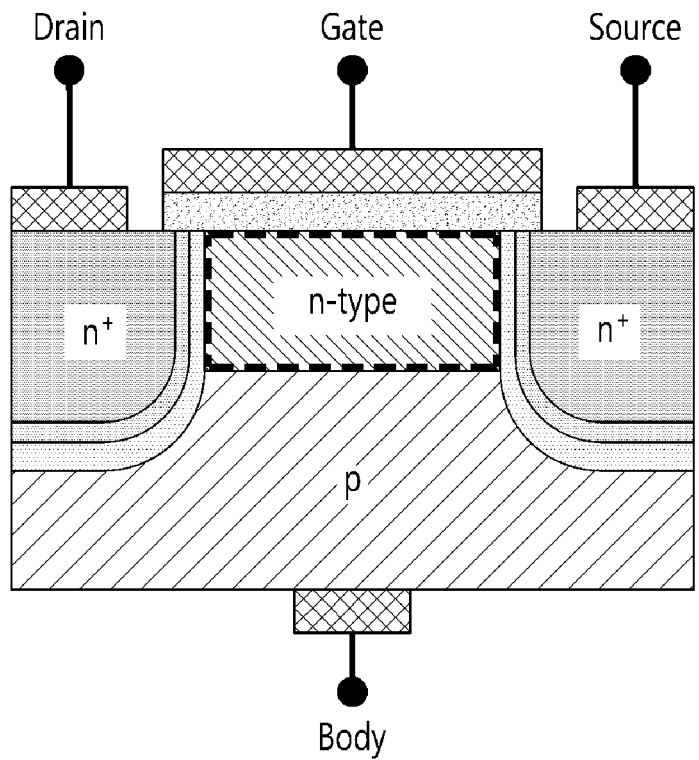
FIGS. 1A-1B illustrate a structure and characteristic of an n-type DEP-FET.

In the detailed description of the present disclosure to be described below, reference is made to the accompanying drawings illustrating specific exemplary embodiments in which the present disclosure may be practiced. These exemplary embodiments are described in sufficient detail to enable those skilled in the art to practice the present disclosure. It should be understood that various exemplary embodiments of the present disclosure are different but need not be mutually exclusive. For example, certain shapes, structures, and characteristics described herein with respect to one exemplary embodiment may be embodied in other exemplary embodiment without departing from the sprit and scope of the present disclosure. In addition, it should be understood that the location or arrangement of individual components within each disclosed exemplary embodiment may be changed without departing from the spirit and scope of the present disclosure. Accordingly, the following detailed description is not intended to be taken in a limiting sense, and the scope of the present disclosure, when properly described, is limited only by the appended claims, along with all scope equivalents to those claimed. In the drawings, similar reference numerals refer to the same or similar functions throughout the various aspects.

Hereinafter, preferred embodiments of the present disclosure will be described in more detail with reference to the drawings.

Based on a new circuit composed of 11 logic gates, (1) circuits in the present disclosure consume near-zero static current in all logic states (−1, 0, +1), and (2) a standard ternary inverter (STI) respectively improves a PDP by 71 times and 245 times compared to the conventional CNTFET or memristor, and a MOSFET-based ternary circuit. (3) A balanced ternary full-adder (BTFA) in the present disclosure shows 48 times better power consumption and 5.3 times better power than other ternary element-based adders. When compared on the same device, it is confirmed from the results that ternary logic is more competitive than binary logic.

Although depletion-mode MOSFETs are not mainstream devices in use these days, the present disclosure requires only additional manufacturing operations where depletion-mode MOSFETs can be easily applied to MOSFET fabrication. That is, the conventional MOSFETs and the depletion-mode MOSFETs can be implemented on the same silicon wafer.

Therefore, the present disclosure provides the most power efficient and manufacturable ternary logic circuit based on two types of MOSFETs and presents a ternary adder design to provide its usefulness. In addition, various additional ternary gates configured to implement the adders are presented and show how the proposed ternary gates are greatly improved over the related art.

1) The present disclosure provides a competitive ternary circuit compared to a binary circuit. Based on logic based on the depletion-mode MOSFET and the conventional MOSFET, the present disclosure shows that the power and performance of the logic are almost similar to those of the binary circuit.

2) The present disclosure provides 11 new ternary logic gates (refer to Table 1) that solve a '0' ($0.5V_{DD}$) state static current problem in a pull-half network (PHN). The ternary circuit of the present disclosure consumes near-zero static current in all logic states ('+1,' '0,' '−1').

3) The ternary logic of the present disclosure is far superior to other ternary circuits in terms of power and performance. For example, the balanced ternary full-adder (BTFA) shows 13.2 times better power-delay-product (PDP) compared to a CNTFET-based BTFA and 4915 times better PDP compared to a memristor- and MOSFET-based BTFA.

TABLE 1

| | Ternary logic gates |
|---|---|
| Existing | T-INV (STI, PTI, NTI) |
| | T-NAND, T-AND, T-NOR, T-OR |
| Proposed | ICI, DCI, NCONS, CONS |
| | T-CDEC, T-MUX3:1 |
| | T-SUM, ANY, NANY, T-BHA, T-BFA |

Hereinafter, the depletion-mode MOSFET (DEP-FET), which is a key element required for low-power ternary logic design, and the conventional MOSFET (MOSFET) having different threshold voltages ($V_{th}$) will be described.

Ternary logic gates are based on balanced logic, and the balanced logic has three logic states: '−1,' '0,' and '+1'. Voltages in each state are 0V, $0.5V_{DD}$, and $1V_{DD}$, respectively.

FIG. 1 illustrates a structure and characteristic of an n-type DEP-FET.

Figure 1B:
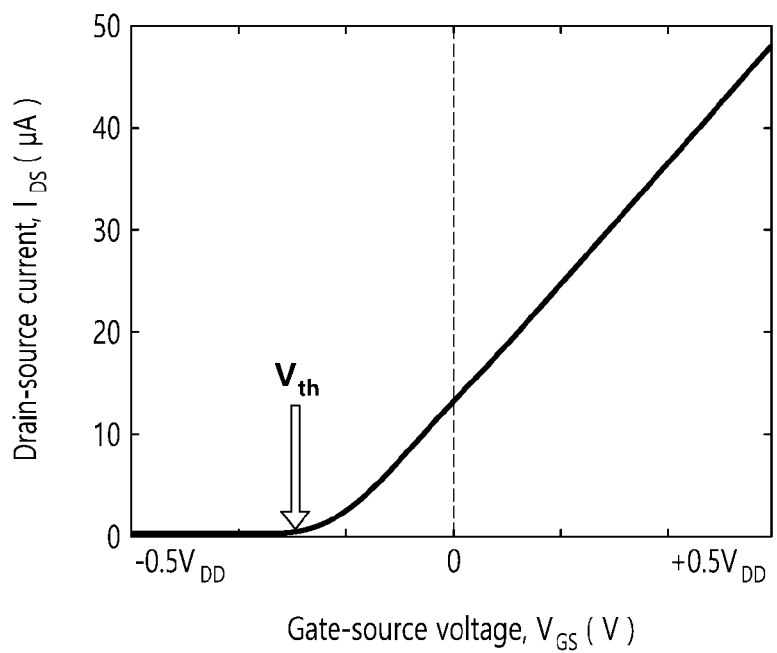

FIG. 1A shows the structure of the n-type DEP-FET. Unlike typical MOSFETs, which have a p-substrate under a gate, a shallow n-doped layer is present under a gate oxide. A conventional n-type MOSFET forms a channel by applying a positive voltage to a gate. However, a drain current of the DEP-FET flows through a pre-doped n-type layer even in the absence of positive $V_G$. Therefore, as shown in FIG. 1B, the DEP-FET has a negative threshold voltage, unlike the typical n-type MOSFET.

The essence of the low-power ternary logic is a pull-half network (PHN) that uses two DEP-FETs for an STI and outputs $0.5V_{DD}$ as a negligible leakage current (described below with reference to FIG. 3B).

Figure 2B:
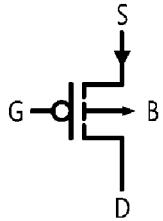
Figure 2B:
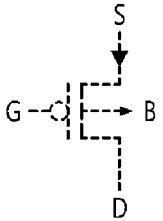
Figure 2B:
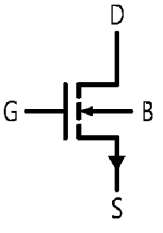
Figure 2B:
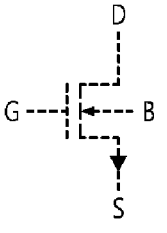

FIGS. 2A-2B illustrate symbols and threshold voltages of DEP-FETs and multi-$V_{th}$ MOSFETs according to the present disclosure.

FIG. 2A shows the symbols and threshold voltages of the DEP-FETs. Table 2 shows operations of the DEP-FETs according to $V_G$. The DEP-FETs are turned on only at $0.5V_{DD}$, and a pDEP-FET or nDEP-FET is turned off at $V_{DD}$ or 0V.

FIG. 2B illustrates the symbols and threshold voltages of the multi-$V_{th}$ transistors required for designing a ternary circuit. The present disclosure classifies the multi-$V_{th}$ MOSFETs into 1) high threshold voltage (hvt) devices and 2) low threshold voltage (lvt) devices according to the absolute value of $V_{th}$. Therefore, four types of MOSFETs (Phvt, Plvt, Nhvt, and Nlvt) are used for implementing the ternary circuit.

The present disclosure implements a ternary gate with fewer transistors by combining the multi-$V_{th}$ devices. This is possible by different operations of the device when $V_G$ is $0.5V_{DD}$. How this is possible will be described below.

A pull-up network (PUN) or a pull-down network (PDN), which connects to $V_{DD}$ or GND, is composed of the multi-$V_{th}$ MOSFETs. The states of the multi-$V_{th}$ MOSFETs according to the gate voltage ($V_G$) are shown in Table 2B below.

TABLE 2

| | (a) DEP-FETs | | (b) Multi-$V_{th}$ MOSFETs | | | |
|---|---|---|---|---|---|---|
| | PHN[a] | | PUN | | PDN | |
| $V_G$ [V] | $P_{dep}$ | $N_{dep}$ | $P_{hvt}$ | $P_{lvt}$ | $N_{hvt}$ | $N_{lvt}$ |
| 0 | ON | OFF | ON | ON | OFF | OFF |
| $0.5 V_{DD}$ | ON | ON | OFF | ON | OFF | ON |
| $V_{DD}$ | OFF | ON | OFF | OFF | ON | ON |

Three ternary inverters (T-INV) using the DEP-FETs and the multi-$V_{th}$ MOSFETs are described below. These are a standard ternary inverter (STI), a positive ternary inverter (PTI), and a negative ternary inverter (NTI). By explaining the operations of these ternary circuits, how the near-zero static current is possible in ternary logic is explained.

Figure 3A:
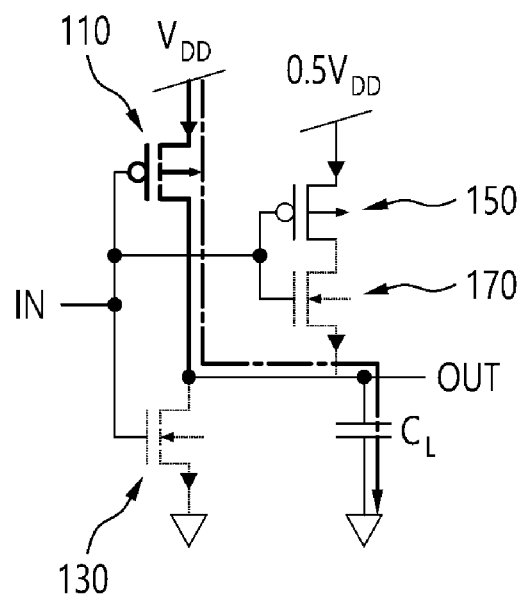
FIGS. 3A-3B illustrate operations of an STI for each input.
Figure 3A:
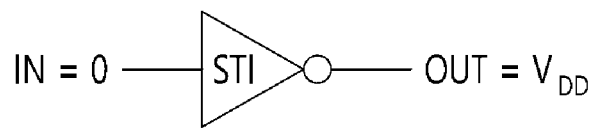
Figure 3B:
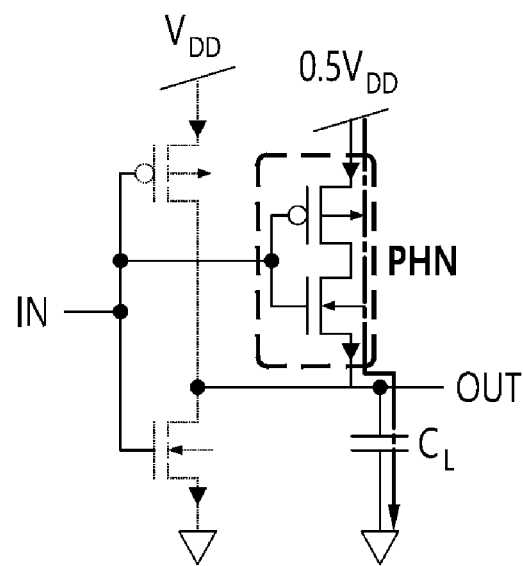
Figure 3B:
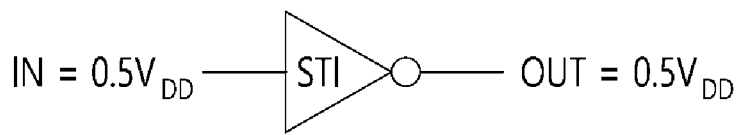

FIGS. 3A-3B illustrate operations of an STI for each input.

In the present disclosure, an STI 100 is composed of a pull-up network (PUN) 110 with a Phvt and a pull-down network (PDN) 130 with an Nhvt. The essence of the near-zero static current in the '0' state is pull-half network (PHN) 150 and 170. The PHN is composed of a Pdep and an Ndep connected in series.

As shown in FIGS. 3A, 3B, and 3C, the STI is designed to turn on one network for each input state. For example, when Vin=$0.5V_{DD}$, the PHN is turned on and other networks (PUN and PDN) are turned off.

This operation is similar to that of a binary inverter in which the PDN is off when the PUN is on (Vin=0V) and the PDN is on when the PUN is off (Vin=$V_{DD}$). The detailed operation of the STI depending on Vin is as follows.

Vin=0V: the PDN and the PHN are turned off, and only the Phvt (PUN) is turned on (Vout=$V_{DD}$)

Vin=$0.5V_{DD}$: both the PUN and the PDN are turned off ($V_{GS}<V_{th}$).

However, the DEP-FET (PHN) is turned on when $V_{GS}$=0. Accordingly, Vout becomes $0.5V_{DD}$ through Vout=PHN.

Vin=$V_{DD}$: the PUN and PHN are turned off, and only the Nhvt (PDN) is turned on (Vout=0)

When the STI is in a steady state of 0V, $0.5V_{DD}$, and $V_{DD}$, a short circuit does not flow. This is because the networks (PUN, PDN, PHN) are completely turned off when the networks (PUN, PDN, and PHN) do not operate. From the point of view of a completely blocked network of the present disclosure, this is equivalent to an operation of a binary inverter.

Figure 4:
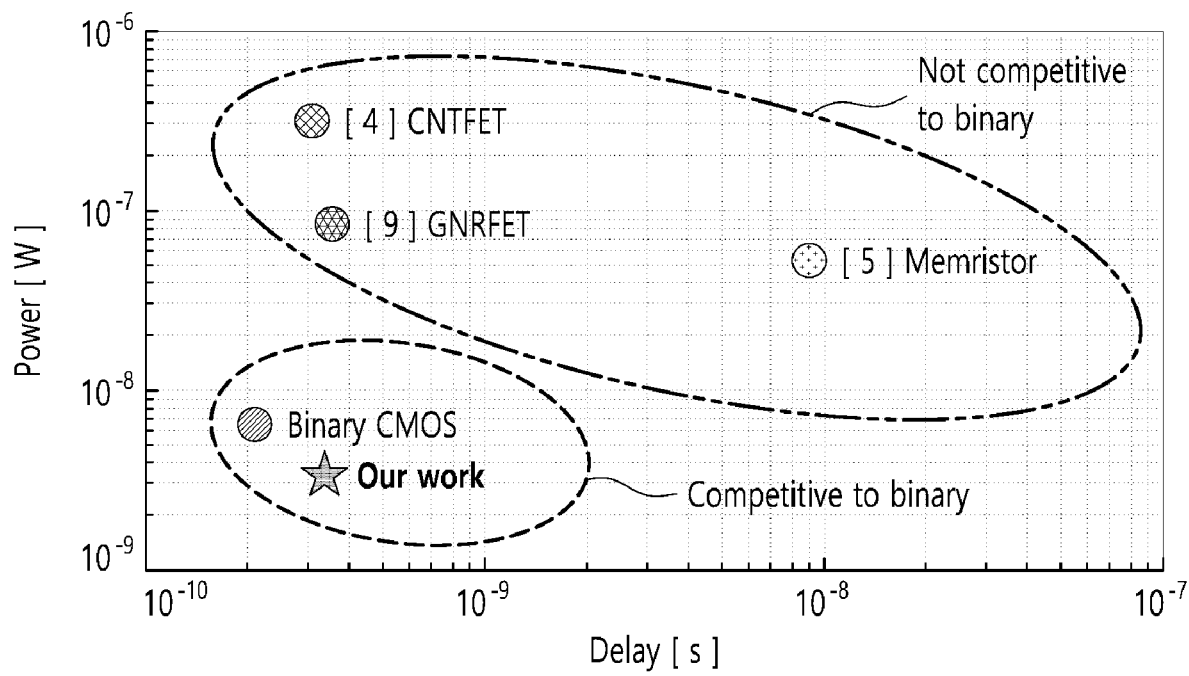
FIG. 4 illustrates a comparison of power and delay of a CNTFET, a memristor and a MOSFET, a GNRFET, and a DEP-FET and a binary CMOS inverter based on the MOSFET and STI.

FIG. 4 shows a comparison of power and delay of a CNTFET, a memristor and a MOSFET, a graphene nano ribbon FET (GNRFET), a DEP-FET and a binary CMOS inverter based on the MOSFET and STI. The STI having the CNTFET or the GNRFET competes with the binary CMOS inverter in terms of stay, but the power consumption of these circuits is huge. In addition, the STI using the memristor is inferior in both delay and power. However, the STI of the present disclosure is on the same scale (power and delay) as the binary CMOS inverter. Therefore, it is highly likely that the ternary circuits based on DEP-FETs will compete with binary gates. The essence of the present disclosure is to have an independent network for operations of each state. The ternary logic of the present disclosure is the only practical circuit that can compete with the binary CMOS.

PTI/NTI

FIGS. 5A-5D illustrate schematic diagrams and symbols of a PTI and an NTI.

Figure 5A:
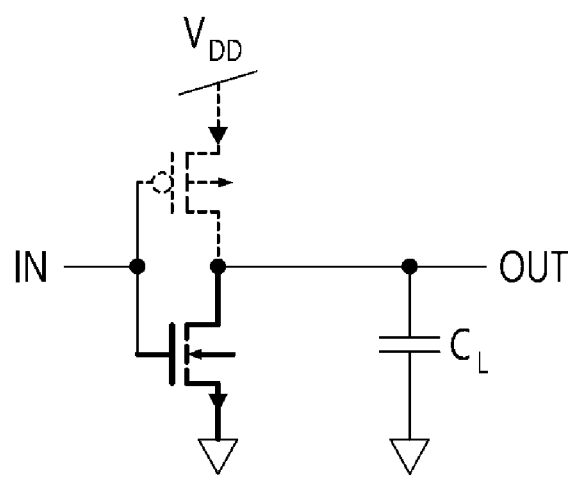
FIGS. 5A-5D illustrate schematic diagrams and symbols of a PTI and an NTI.
Figure 5B:
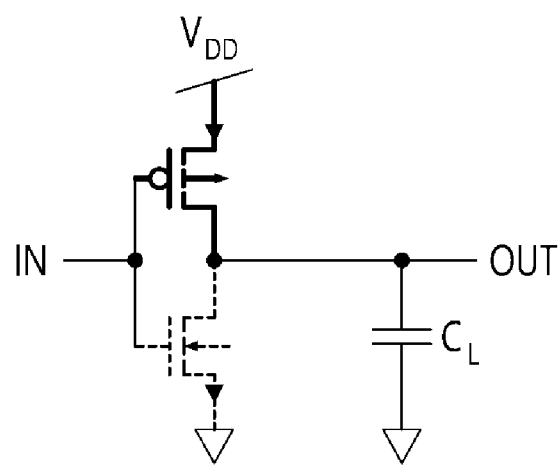
Figure 5C:
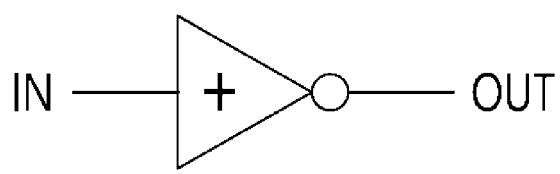
Figure 5D:
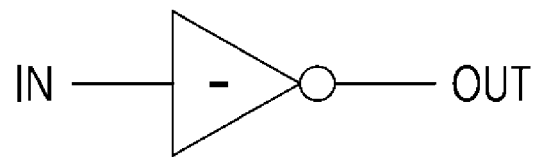
Figure 6A:
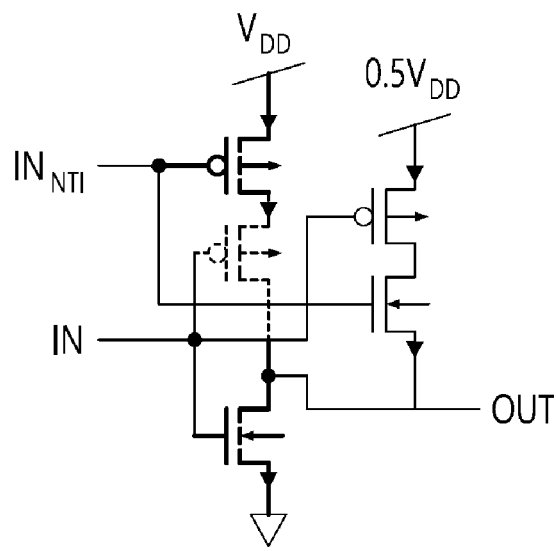
FIGS. 6A-6D illustrate schematic diagrams and symbols of an ICI and a DCI.
Figure 6B:
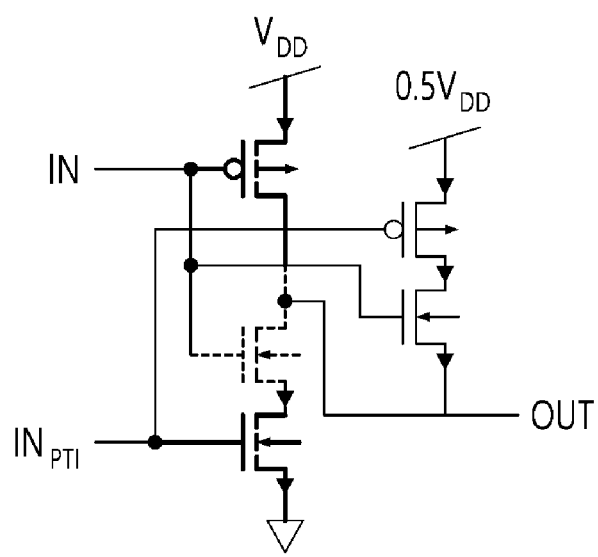
Figure 6C:
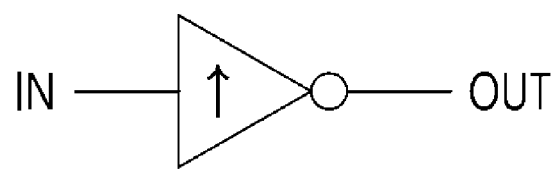
Figure 6D:
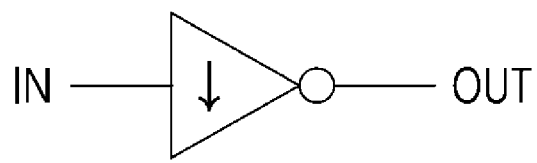

FIGS. 5A and 5B illustrate schematic diagrams of PTI and NTI gates, and Table 3 illustrates operations of the PTI and NTI for each input.

TABLE 3

| Logic | PTI | | | NTI | | |
|---|---|---|---|---|---|---|
| input | $P_{lvt}$ | $N_{hvt}$ | Output | $P_{hvt}$ | $N_{lvt}$ | Output |
| −1 | ON | OFF | +1 | ON | OFF | +1 |
| 0 | ON | OFF | +1 | OFF | ON | −1 |
| +1 | OFF | ON | −1 | OFF | ON | −1 |

Since the PTI and the NTI do not output logical value '0' ($0.5V_{DD}$), the PTI and the NTI are composed of only the PDN and the PUN. Thus, the PTI is composed of the Plvt and the Nhvt and the NTI is composed of the Phvt and the Nlvt. The PUN of the PTI composed of the Plvt is turned on when an input is '−1' or '0,' and is turned off when an input is '+1.' Conversely, the PDN of the PTI composed of the Nhvt is turned off when an input is '−1' or '0,' and is turned on when an input is '+1.' Similarly, the PUN of the NTI composed of the Phvt is turned on when an input is '−1,' and is turned off when an input is '0' or '+1.' The PDN of the NTI operates the opposite of the PUN. All networks of the PTI and the NTI operate in a complementary manner and no short-circuit current flows under normal conditions.

Hereinafter, 11 new ternary circuits based on the DEP-FETs and the multi-$V_{th}$ MOSFETs are provided. The proposed gate uses various types of transistors described in FIG. 2, and all gates consume near-zero static current in the $0.5V_{DD}$ state.

FIGS. 6A-6D illustrate schematic diagrams and symbols of an ICI and a DCI.

FIGS. 6A-6D show schematic diagrams of an increasing cycling inverter (ICI) and a decreasing cycling inverter (DCI), and Table 4 shows their operations.

TABLE 4

| Logic input | Logic output | | | | |
|---|---|---|---|---|---|
| | ICI | DCI | T-DEC$_{-1}$ | T-DEC$_0$ | T-DEC$_{+1}$ |
| −1 | 0 | +1 | +1 | −1 | −1 |
| 0 | +1 | −1 | −1 | +1 | −1 |
| +1 | −1 | 0 | −1 | −1 | +1 |

The ICI is a gate configured to output a '+1' value of a given input, and the DCI is a gate configured to output a '−1' value of a given input. Both the ICI/DCI return to min/max ('−1'/'+1') values when overflow/underflow occurs.

The ICI is composed of 7 transistors, including the NTI inverting an input. The Plvt, the Nhvt, and the Pdep are connected to the Vin, and the Phvt and the Ndep are connected to an input signal filtered by the NTI (IN$_{NTI}$). The Pdep of the PHN is turned on when an input is '−1' or '0,' and the Ndep is turned on only when an input is '−1.' This is because an input filtered by the NTI provides only '+1, −1, −1.'

Therefore, the PHN of the ICI outputs $0.5V_{DD}$ only when an input is '−1.' The Phvt connected to the NTI in the ICI is turned on when an input is '0' and '+1,' and the Plvt is turned on when an input is '−1' and '0.' Therefore, the PUN outputs $V_{DD}$ when an input is '0' and when both the Phvt and the Plvt are turned on. The Nhvt (PDN) is turned on when an input is '+1.'

Like the ICI, the DCI has 7 transistors, including a PTI's input filter. The Phvt (PUN) outputs $V_{DD}$ only when Vin='−1.' The PHN is a series connection of the Pdep (an input filtered by PTI) and the Ndep. The Pdep is turned on only at '+1' and the Ndep is turned on only at '0' and '+1.' Therefore, when the Vin is '+1,' the PHN outputs $0.5V_{DD}$. The Nhvt (PDN, an input filtered by PTI) is connected in series with the Nlvt. Therefore, both NMOSs are turned on when an input is '0.'

Figure 7A:
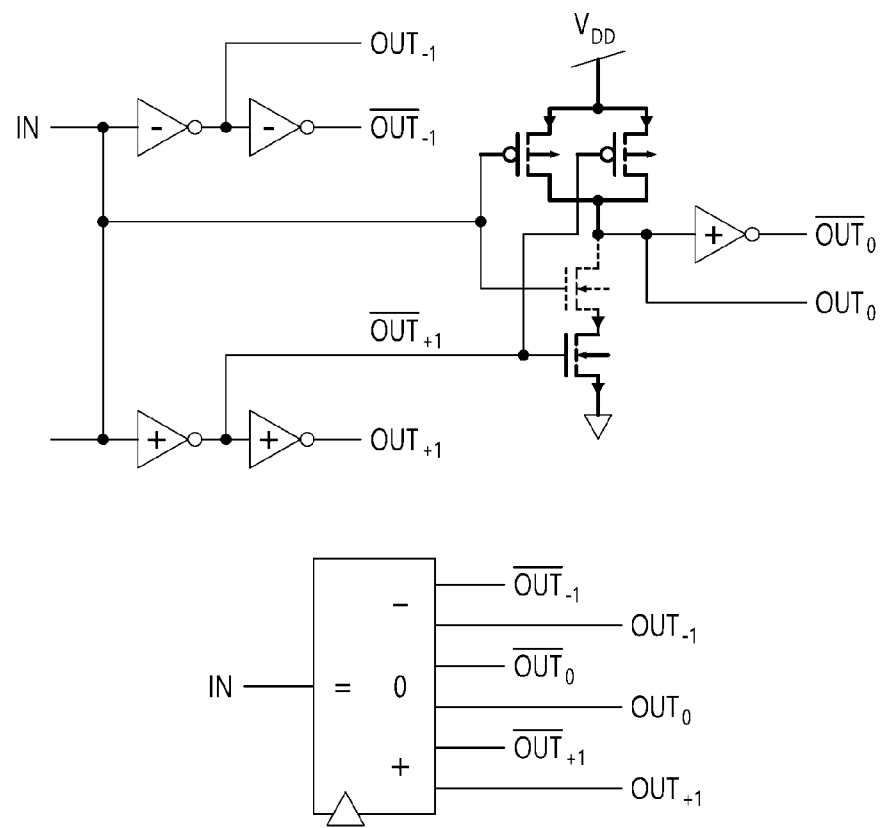
FIGS. 7A-7B illustrate schematic diagrams and symbols of a T-CDEC and a 3:1 T-MUX.
Figure 7B:
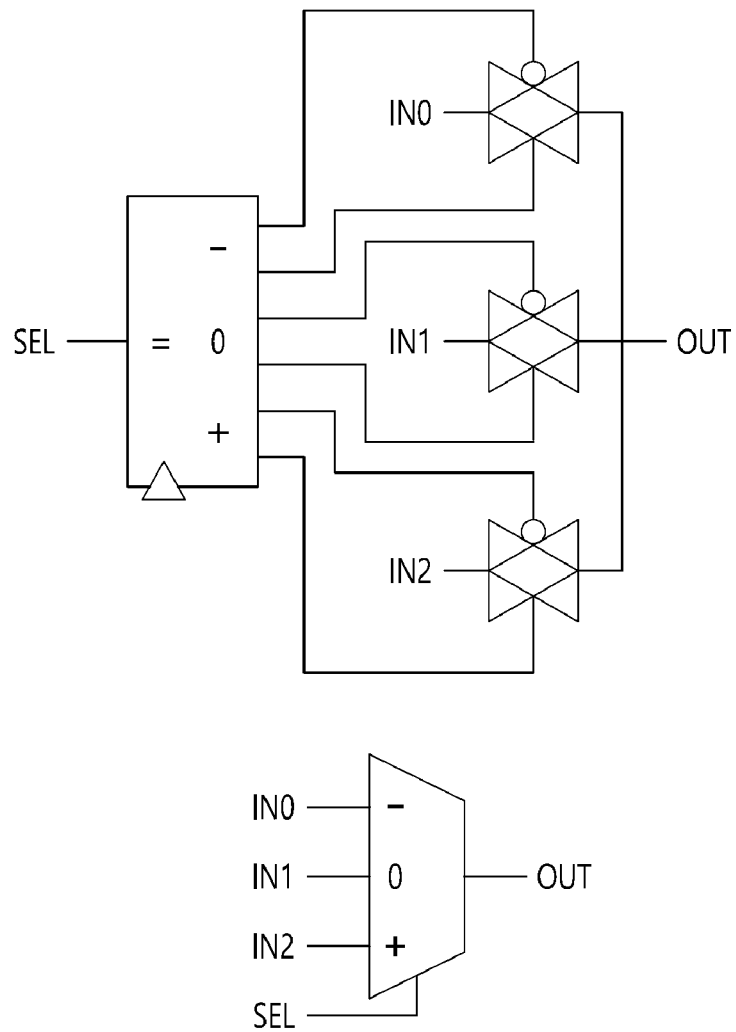

FIGS. 7A-7B illustrate schematic diagrams and symbols of a T-CDEC and a 3:1 T-MUX.

FIG. 7A shows a schematic diagram of the ternary complementary decoder (T-CDEC). Similar to the T-CDEC, a ternary decoder (T-DEC) is a gate composed of three output ports ('−1,' '0,' '+1'). An output port of the T-DEC outputs '+1' when a corresponding input is inserted and '−1' otherwise (refer to Table 4 for the truth table). The T-DEC has 3 output nodes whereas the T-CDEC of the present disclosure has 6 output nodes complementary to the outputs of the T-DEC. The conventional T-DEC is composed of the PTI, the NTI, a B-INV, and a T-NOR, and the total number of transistors is 14. However, the T-CDEC of the present disclosure is designed with the same number of transistors as the T-DEC. A circuit with 4 multi-V$_{th}$ transistors replaces the bulky T-NOR.

The ternary 3:1 multiplexer (3:1 T-MUX) is a gate configured to select three inputs (IN0, IN1, or IN2) according to a select (SEL) signal and output the selected input. (refer to FIG. 7B)

The present disclosure implements this as 3 transmission gates composed of one T-CDEC and the Plvt and the Nlvt. Typically, the 3:1 T-MUX uses a T-DEC gate as the select signal for the transmission gate, so that 6 additional transistors are required to generate an inverting control signal. However, since the proposed T-CDEC generates an original output and an inverted output, it may be implemented without a separate inverter. Therefore, the 3:1 T-MUX of the present disclosure is composed of 20 transistors, which is 6 fewer than the conventional 3:1 T-MUX.

Figure 8A:
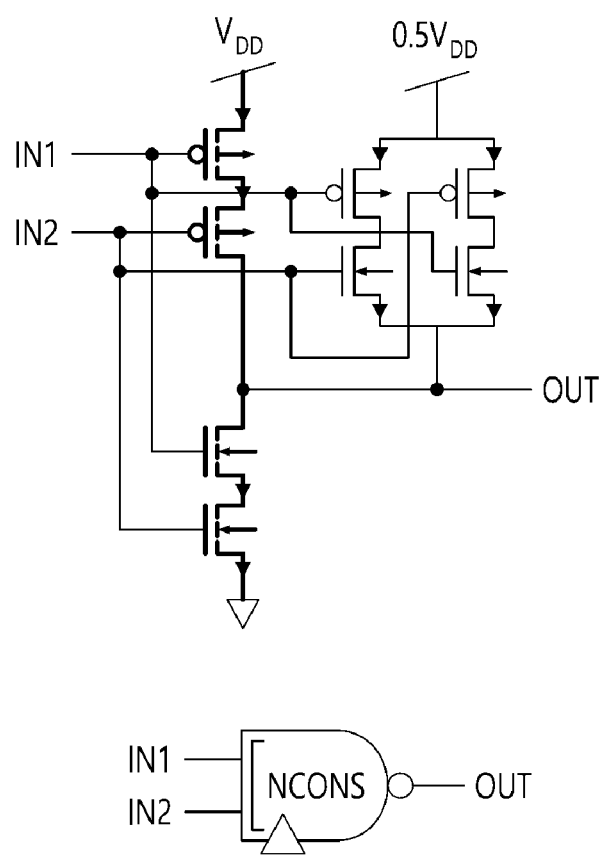
FIGS. 8A-8C illustrate schematic diagrams and symbols of NCONS, ANY and T-SUM.
Figure 8B:
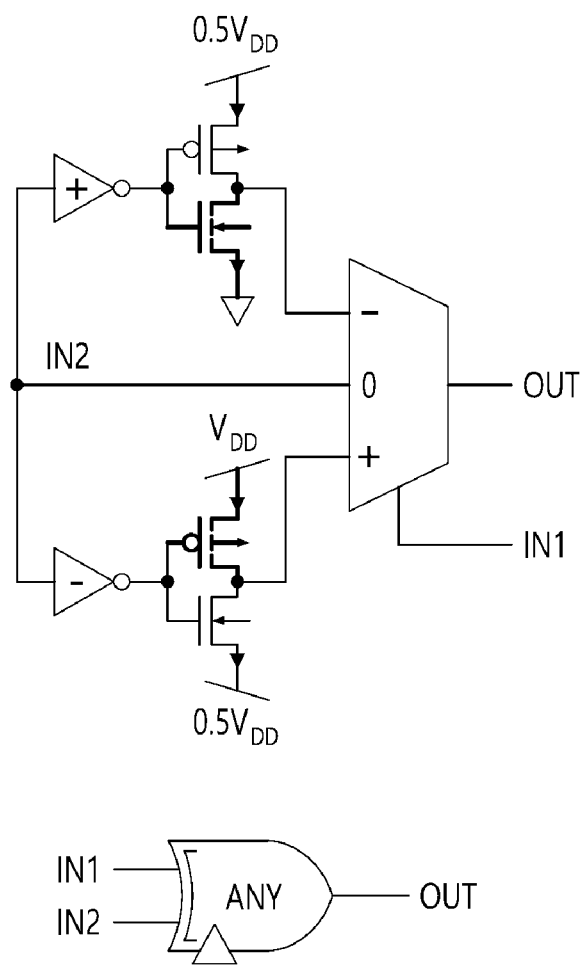
Figure 8C:
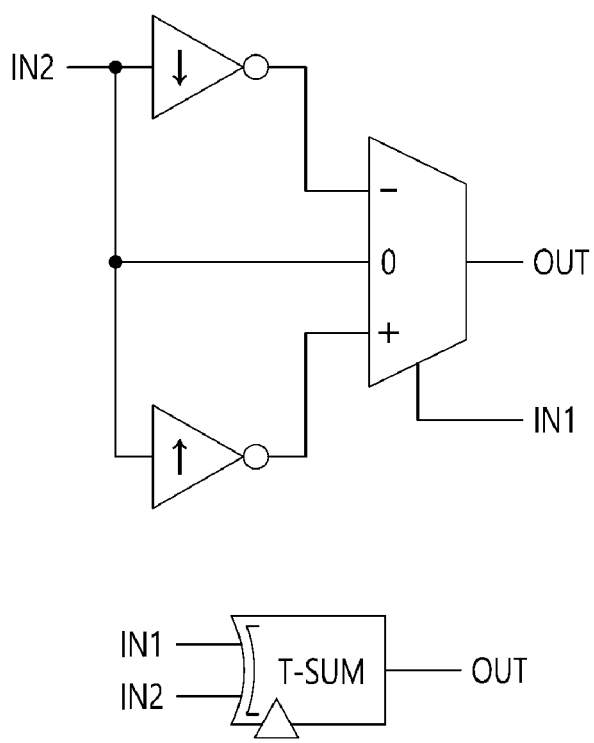

FIGS. 8A-8C illustrate schematic diagrams and symbols of NCONS, ANY and T-SUM.

NCONS is a gate in which an output of consensus (CONS) is inverted, which is used to generate a carry of a balanced half-adder. FIG. 8A illustrates a schematic diagram of NCONS, and the truth table is described in Table 5.

TABLE 5

| Logic input | | Logic output | | | | |
|---|---|---|---|---|---|---|
| IN1 | IN2 | T-NAND | T-NOR | NCONS | ANY | T-SUM |
| −1 | −1 | +1 | +1 | +1 | −1 | +1 |
| −1 | 0 | +1 | 0 | 0 | −1 | −1 |
| −1 | +1 | +1 | −1 | 0 | 0 | 0 |
| 0 | −1 | +1 | 0 | 0 | −1 | −1 |
| 0 | 0 | 0 | 0 | 0 | 0 | 0 |
| 0 | +1 | 0 | −1 | 0 | +1 | +1 |
| +1 | −1 | +1 | −1 | 0 | 0 | 0 |
| +1 | 0 | 0 | −1 | 0 | +1 | +1 |
| +1 | +1 | −1 | −1 | −1 | +1 | −1 |

NCONS generates an output of '+1' when an input is (−1, −1) and generates '−1' when an input is (+1, +1). In all other cases, outputs are '0.' Two of the Phvts are connected in series to output $V_{DD}$ (+1) for an input (−1, −1). Similarly, two of the Nhvts are connected in series to output 0V for an input (+1, +1). For all other input pairs, two of the Pdeps and two of the Ndeps are connected in parallel for $0.5V_{DD}$. The STI is added to the output of NCONS for implementing the gate of the CONS.

ANY, NANY and T-SUM

FIG. 8B shows a schematic diagram of all accept (ANY) gates and is used for carry operations in a balanced full-adder. The truth table of the ANY gate is described in Table 5.

For an input '−1, 0, +1,' a sub-circuit connected to a '−' port of the 3:1 T-MUX outputs '+1, +1, 0.' In case of a '+' port, the 3:1 T-MUX outputs '0, +1, −1' for the same input. Since all transistors of these two sub-circuits are turned on and off in a complementary manner, these circuits do not generate short circuit currents. The IN1 is inserted into a SEL port of the 3:1 T-MUX and acts as the ANY gate. The NANY gate is implemented by adding the STI to the output of ANY.

FIG. 8C shows a schematic diagram of the ternary sum (T-SUM) gate and is used for summing in a balanced adder. Table 5 shows the truth table of T-SUM. This T-SUM is composed of the ICI, the DCI and the 3:1 T-MUX. The IN1 is inserted into the SEL port of the 3:1 T-MUX and the IN2 is filtered through the DCI/ICI supplied to the '−'/'+' port of the 3:1 T-MUX.

Figure 9A:
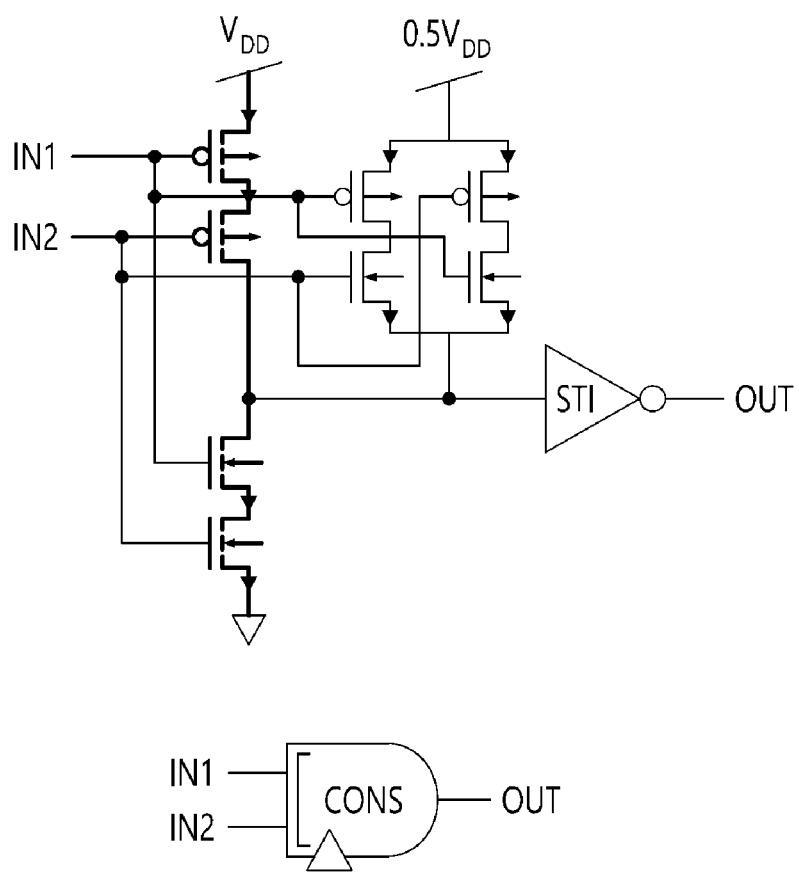
FIGS. 9A-9B illustrate schematic diagrams and symbols of CONS and NANY.
Figure 9B:
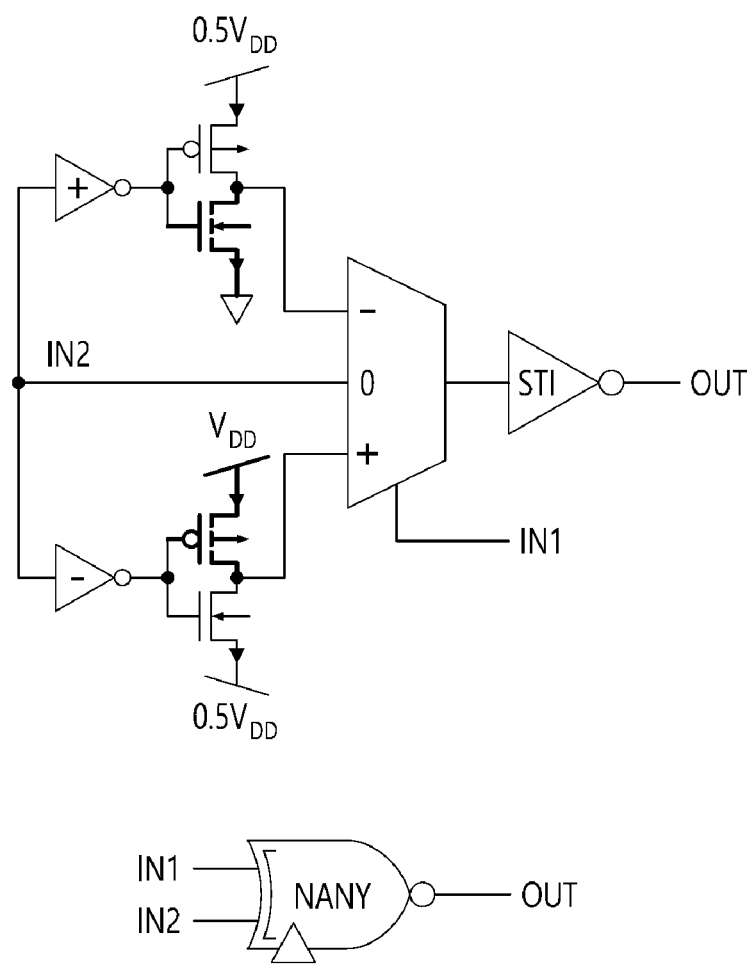

FIGS. 9A-9B illustrate schematic diagrams and symbols of CONS and NANY. CONS is configured by adding the STI to the NCONS logic circuit, and NANY is configured by adding the STI to the ANY logic circuit.

Figure 10:
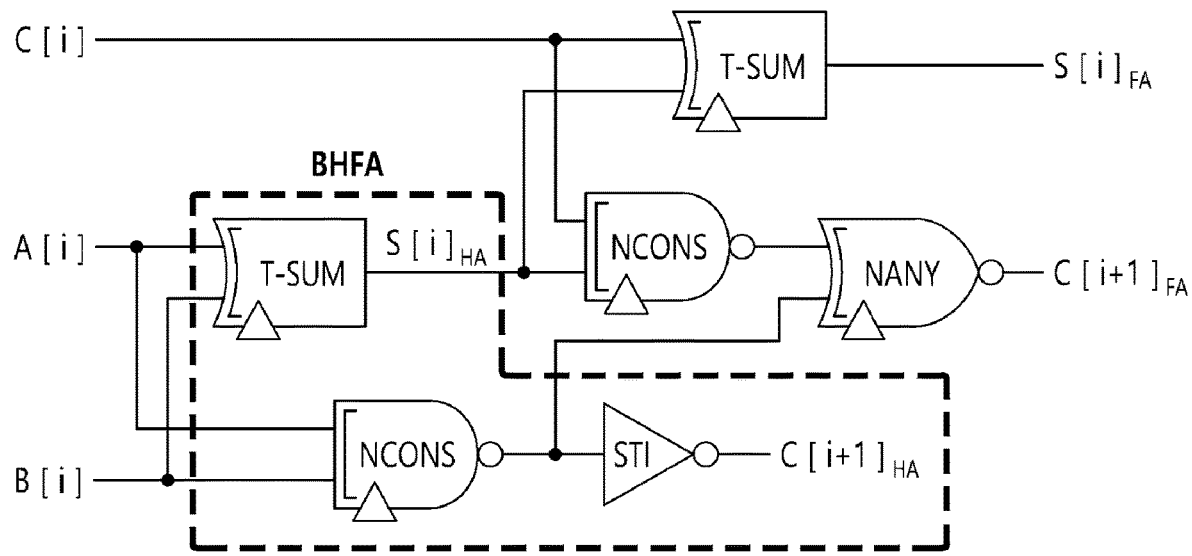
FIG. 10 illustrates schematic diagrams of a balanced ternary full-adder according to the present disclosure.

FIG. 10 illustrates a schematic diagram of a balanced half-adder (BHFA) and a balanced ternary full-adder (BTFA). The BHFA is composed of T-SUM and CONS and is indicated by broken lines. The BTFA is designed in the form of a look-up table using the T-MUX. The BTFA is composed of 224 transistors. The BTFA of the present disclosure is composed of two NCONS gates, two T-SUM gates and one NANY gate. NCONS is composed of 8 transistors, T-SUM is composed of 34 transistors, and NANY is composed of 32 transistors. Therefore, the BTFA of the present disclosure is designed with a total of 116 transistors. The BTFA of the present disclosure is an improvement of a DEP-FET-based BTFA, and a detailed analysis of these two BTFAs will be described below.

In this section below, the performance of the gate of the present disclosure is compared to other ternary gates such as a CNTFET and a memristor. It also shows how the full-adder of the present disclosure is improved compared to other full-adders proposed in many previous studies. The DEP-FET and the multi-$V_{th}$ MOSFET of the present disclosure are based on a STARC HiSIM2 MOSFET model, and an experiment is performed through Synopsys HSPICE.

Hereinafter, comparison with other devices will be described.

Figure 11A:
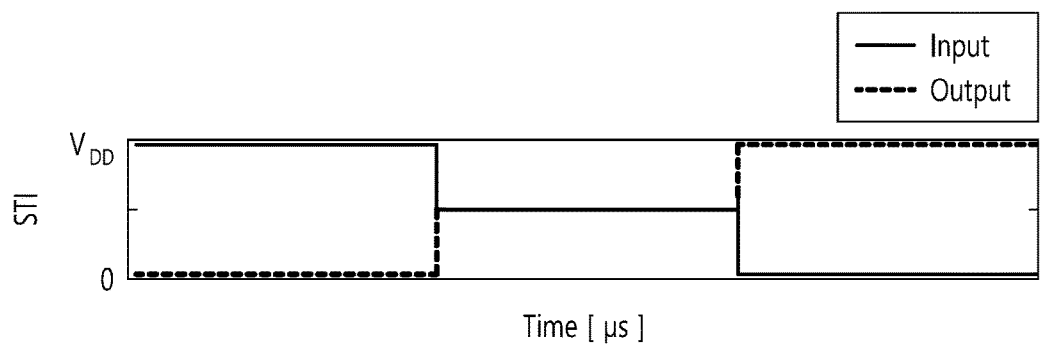
FIGS. 11A-11C illustrate a transient simulation result of the STI according to the present disclosure and the conventional STI.
Figure 11B:
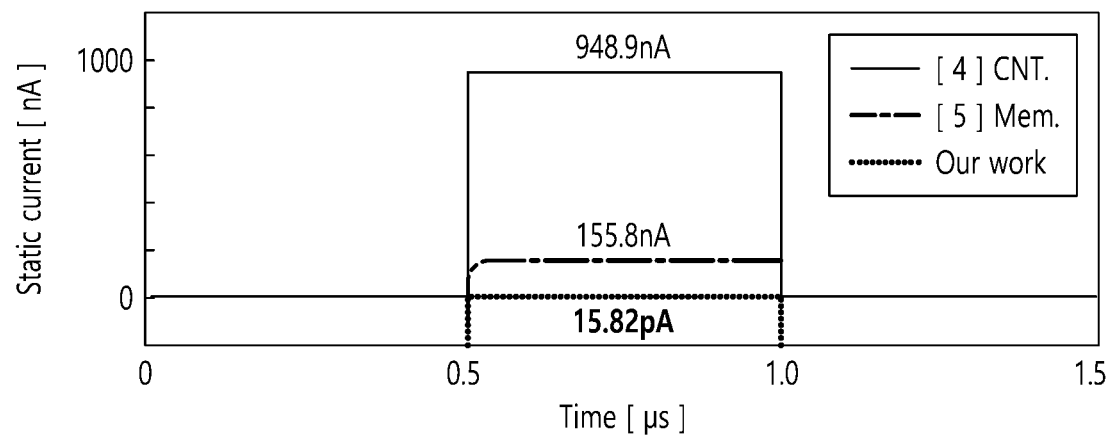

FIG. 11A illustrates an input/output waveform of the STI, and FIG. 11B shows a current of the corresponding outputs of the conventional STI and an operation of the present disclosure. The conventional STIs exhibit significant static currents of 948.9 nA (CNTFET) and 155.8 nA (memristor) in a '0' output state.

Figure 11C:
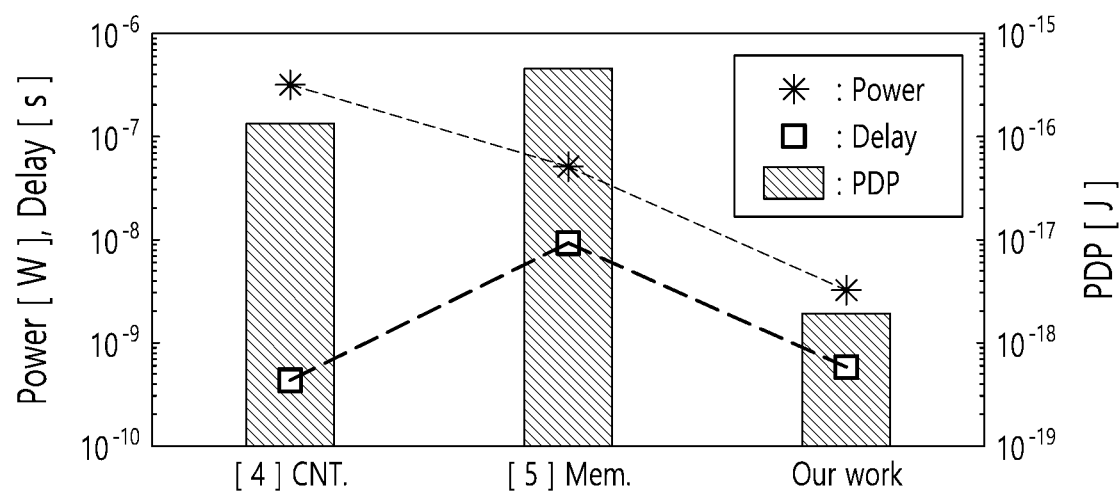

However, the STI of the present disclosure shows a near-zero static current of 15.82 pA, which is 0.002% and 0.01% of the CNTFET and the memristor. As shown in FIG. 11C, since the power consumption of the STI is very low, the power delay product (PDP) of the STI of the present disclosure is 71 times and 245 times better than those of the CNTFET and the memristor. The delay of the CNTFET STI is similar to that of the STI. However, due to the significant power consumption of the CNTFET, the PDP is inferior. Therefore, the present disclosure is a significant improvement of ternary logic not previously achieved.

Figure 12:
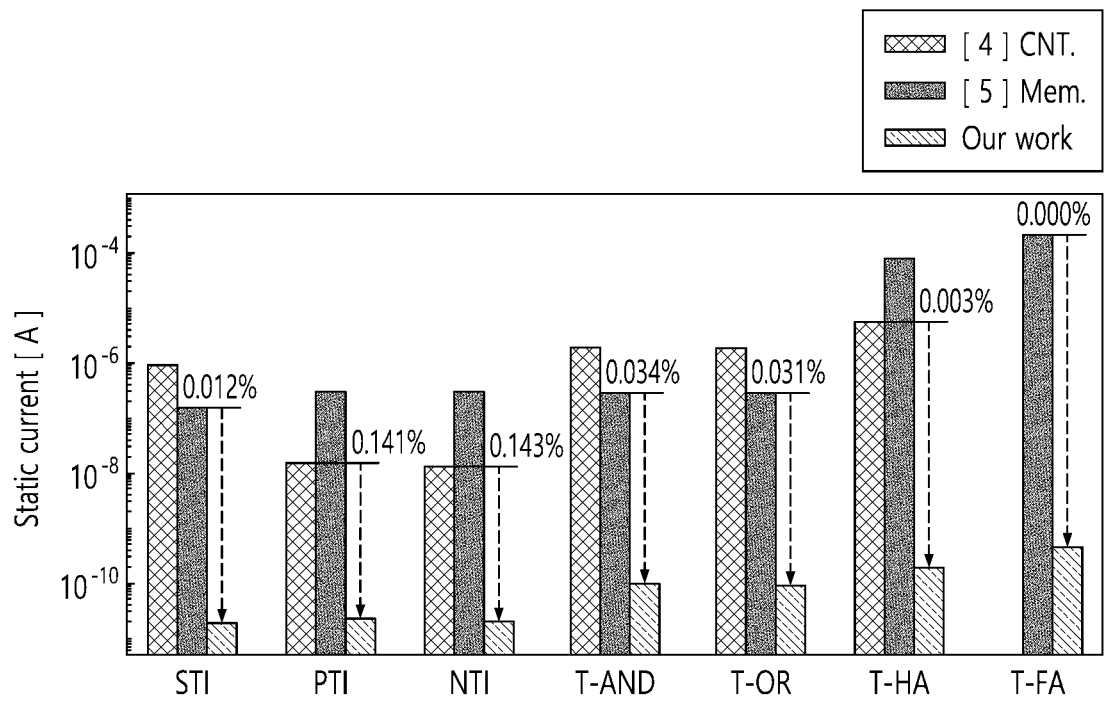
FIG. 12 illustrates a comparison of worst-case static currents.

FIG. 12 illustrates a '0' state static current of various types of ternary logic based on the present disclosure, a CNTFET and a memristor, respectively. For normalized $V_{DD}$=1V, the static current of the STI is measured in various devices. The gates of the present disclosure have very low static currents, unlike the CNTFET or the memristor, which use micro to nanoscale static currents and a MOSFET based design.

Figure 13:
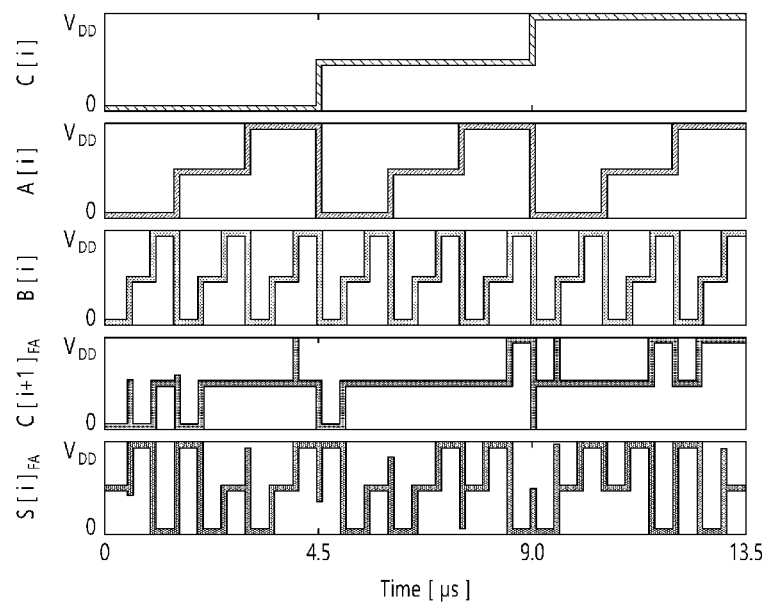
FIG. 13 illustrates a waveform of the balanced ternary full-adder according to the present disclosure.

FIG. 13 illustrates a waveform of a balanced ternary full-adder according to the present disclosure. Table 6 shows the results of comparing the conventional DEP-FET, CNT-FET, and memristor with the DEP-FET of the present disclosure.

TABLE 6

| BTFA | Power [W] | Current [A] | Delay [s] | PDP [J] | Tr count |
|---|---|---|---|---|---|
| [11] CNT. | 3.44e−6 | 5.79e−6 | 2.70e−9 | 9.29e−15 | 130 |
| [5] Mem. | 1.55e−4 | 2.21e−4 | 2.23e−8 | 3.46e−12 | 97 |
| [6] DEP. | 3.83e−7 | 7.01e−10 | 5.40e−9 | 2.07e−15 | 226 |
| Our work | 7.21e−8 | 3.82e−10 | 9.76e−9 | 7.04e−16 | 116 |

Among the conventional ternary full-adder designs, the full-adder of the present disclosure consumes the lowest average power and static current. In addition, the average power of the multiplexer-based full-adder implemented with the conventional DEP-FET is about 5.3 times greater than that of the present disclosure. The conventional CNTFET-based unbalanced ternary full-adder shows the fastest delay (2.70 ns) among the four adders. However, the power consumption of the CNTFET full-adder is 3.44 μW. Therefore, the PDP of the present disclosure is 13.2 times better than the CNTFET-based adder. A CNTFET-based low-power full-adder has been previously proposed, but this adder suffers from a static current problem in the '0' state.

Finally, the conventional memristor- and MOSFET-based full-adders have fewer transistors. However, they also consume significant power, which may not be acceptable for a ternary logic design. Therefore, the adder of the present disclosure has the lowest PDP among other adders and is the most practical adder with the possibility of binary logic competition.

In the present disclosure, 11 ternary logic gates including a depletion-mode MOSFET and a balanced full-adder based on the multi-$V_{th}$ MOSFET are proposed. The ternary logic gate of the present disclosure is competitive over binary in speed and power due to three networks (pull-up, pull-down, and pull-half) that are completely turned off when not in operation. The balanced full-adder of the present disclosure exhibits a PDP that is 13.2 times better than other device-based adders and a PDP that is 2.94 times better than the conventional depletion MOSFET based design.

This ternary logic circuit design method using the MOSFETs having the depletion-mode and the multiple threshold voltages may be implemented as an application or in the form of program instructions that may be executed through various computer components and recorded in computer-readable recording media. The computer-readable recording media may include program instructions, data files, data structures, and the like, alone or in combination.

In addition, the program may be stored in a memory connected to a processor and executed by the processor.

The program instructions recorded in the computer-readable recording media are specially designed and configured for the present disclosure, and may be known and used by those skilled in the computer software field.

Examples of computer-readable recording media include magnetic media such as hard disks, floppy disks, and magnetic tapes, optical recording media such as CD-ROMs and DVDs, magnetic-optical media such as floptical disks, and hardware devices specifically configured to store and execute program instructions such as ROMs, RAMs, flash memories, and the like.

Examples of the program instructions include not only machine language code such as that generated by a compiler, but also high-level language code that can be executed by a computer using an interpreter and the like. The hardware device may be configured to operate as one or more software modules to perform processing according to the present disclosure, and vice versa.

The present disclosure can design a ternary logic circuit capable of a low-power operation due to no static current consumption, which is a chronic problem of ternary circuits, in all logic states including an intermediate state '0.'

Although the above has been described with reference to the exemplary embodiments, it will be understood by those skilled in the art that the present disclosure may be variously modified and changed within the spirit and scope of the present disclosure described in the following claims.

A ternary computing system is attracting great attention as a next-generation computing technology. Since the present disclosure relates to the design of a logic gate, which is a key component of a ternary computing device, it may be usefully applied throughout the semiconductor industry.

The DEP-FET and MTCMOS used in the present disclosure are silicon-based transistors most commonly used in commercial semiconductors, and their fabrication methods are suitable for commercial processes. In addition, they have high marketability by solving the static voltage problem, which is a chronic problem of ternary circuits.

What is claimed is:

1. A method of designing a ternary logic circuit using MOSFETs having a depletion-mode and multiple threshold voltages, the method comprising:

configuring a pull-half network (PHN) by connecting two or more DEP-FETs;

configuring one or more of a pull-up network (PUN) and a pull-down network (PDN) with one or more MOSFETs having different threshold voltages; and connecting the PHN to the one or more of the PUN and the PDN.

2. The method of claim 1, wherein a Pdep and an Ndep are connected in series in the two or more DEP-FETs.

3. The method of claim 1, wherein the PUN comprises one or more of a Phvt and a Plvt, and the PDN comprises one or more of an Nhvt and an Nlvt.

4. The method of claim 3, further comprising configuring one or more logic circuits among an ICI logic circuit, a DCI logic circuit, a T-CDEC logic circuit, a 3:1 T-MUX logic circuit, NCONS logic circuit, and ANY logic circuit by adding one or more transistors to the one or more logic circuits.

5. The method of claim 4, further comprising:
configuring a CONS logic circuit by adding an STI to the NCONS logic circuit; or
configuring a NANY logic circuit by adding an STI to the ANY logic circuit.

6. The method of claim 4, further comprising configuring a T-SUM logic circuit by connecting the ICI logic circuit, the DCI logic circuit, and the 3:1 T-MUX logic circuit.

7. A non-transitory computer-readable storage medium having a computer program recorded thereon for performing a method for designing a ternary logic circuit using MOSFETs having a depletion-mode and multiple threshold voltages, the method comprising:
configuring a pull-half network (PHN) by connecting two or more DEP-FETs;
configuring one or more of a pull-up network (PUN) and a pull-down network (PDN) with one or more MOSFETs having different threshold voltages; and
connecting the PHN to the one or more of the PUN and the PDN.

8. A device for designing a ternary logic circuit using MOSFETs having a depletion-mode and multiple threshold voltages, the device comprising:
a processor; and
a memory connected to the processor,
wherein the memory stores program instructions executable by the processor to:
configure a pull-half network (PHN) by connecting two or more DEP-FETs in series;
configure one or more of a PUN and a PDN with one or more MOSFETs having different threshold voltages; and
connect the PHN to one or more of the PUN and the PDN.

* * * * *